United States Patent [19]

McKenzie

[11] 4,242,414
[45] Dec. 30, 1980

[54] WEATHER-RESISTANT TRANSPARENT COMPOSITE FILM

[75] Inventor: Eugene L. McKenzie, Saint Paul, Minn.

[73] Assignee: Minnesota Mining and Manufacturing Company, Saint Paul, Minn.

[21] Appl. No.: 959,721

[22] Filed: Nov. 13, 1978

Related U.S. Application Data

[63] Continuation of Ser. No. 860,340, Dec. 14, 1977, abandoned, which is a continuation-in-part of Ser. No. 568,474, Apr. 16, 1975, Pat. No. 4,064,314.

[51] Int. Cl.³ .................... B32B 27/30; B32B 27/06
[52] U.S. Cl. ........................... 428/412; 156/71; 156/99; 156/106; 156/108; 160/19; 428/483; 428/520; 428/522; 428/910; 428/911; 428/913
[58] Field of Search ............... 428/412, 483, 520, 522, 428/910, 911, 913; 156/108, 71, 99, 106; 160/19

[56] References Cited

U.S. PATENT DOCUMENTS

| | | |
|---|---|---|
| 2,787,568 | 4/1957 | Koblitz .................................. 428/412 |
| 3,309,219 | 3/1967 | Etherington ......................... 428/412 |
| 3,318,975 | 5/1967 | Deichert et al. ................. 428/483 X |
| 3,457,104 | 7/1969 | Bristol ................................. 428/412 |
| 3,532,590 | 10/1970 | Priddle ............................... 428/412 |
| 3,582,398 | 6/1971 | Ringler ................................ 428/412 |
| 3,661,685 | 5/1972 | Osteen ............................ 428/412 X |
| 3,681,167 | 8/1972 | Moore ............................. 42/412 X |
| 3,707,397 | 12/1972 | Gagnon ............................. 428/412 |
| 3,810,815 | 5/1974 | Welhart et al. ..................... 428/412 |
| 3,908,052 | 9/1975 | Sanders ................................. 428/1 |
| 4,064,314 | 12/1977 | McKenzie ........................... 428/494 |
| 4,107,391 | 8/1978 | Moore et al. ................... 428/412 X |
| 4,146,658 | 3/1979 | Humphrey ..................... 428/412 X |

*Primary Examiner*—Harold Ansher
*Attorney, Agent, or Firm*—Cruzan Alexander; Donald M. Sell; Roger R. Tamte

[57] ABSTRACT

A composite film structure which is useful as a non-brittle, impact-resistant, exceptionally durable, window pane in greenhouses and similar structures, or as storm windows, solar collector covers, etc., comprises an oriented polycarbonate support film laminated to a weather-resistant oriented film of polymethylmethacrylate.

7 Claims, 1 Drawing Figure

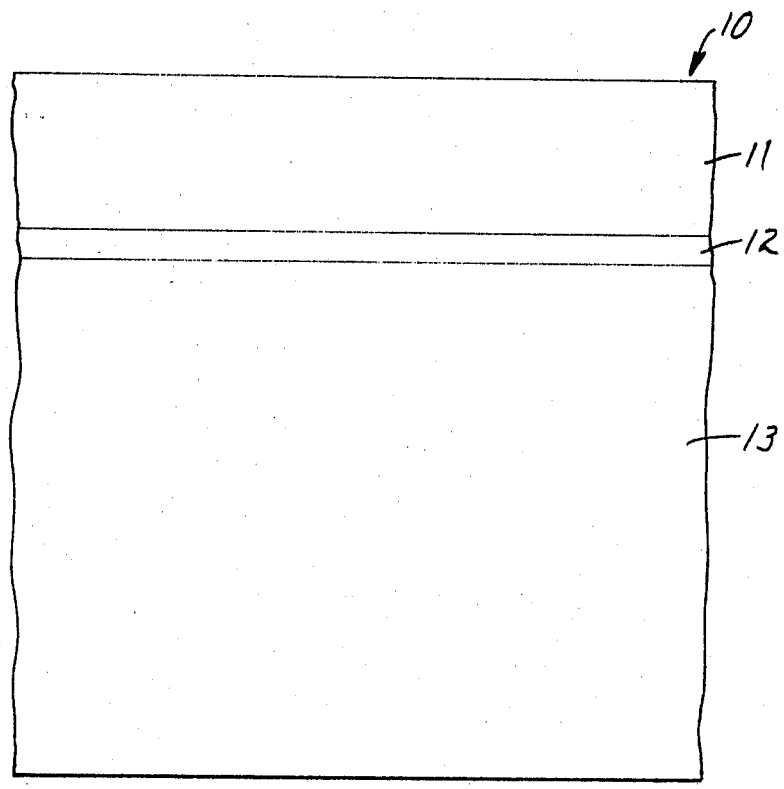

WEATHER-RESISTANT TRANSPARENT COMPOSITE FILM

REFERENCE TO RELATED APPLICATIONS

This application is a continuation of my application Ser. No. 860,340, filed Dec. 14, 1977, now abandoned, which in turn is a continuation-in-part of my application Ser. No. 568,474, filed Apr. 16, 1975, now U.S. Pat. No. 4,064,314.

The use of glass window panes in the outer walls and roofs of greenhouses and similar buildings adds greatly to the cost of those buildings. Initial construction costs are high because glass windows require expensive frame structures; and replacement costs are high because glass is easily broken during stormy weather, in various kinds of accidents, and by vandals.

Plastic films have been investigated as a replacement for glass in greenhouses, but all those tried have had serious deficiencies. Polyethylene has been the most commonly used, but outdoor exposure causes such a rapid deterioration in polyethylene—making the film hazy and embrittled—so that it can be used for only a season or two. Polyester films also deteriorate during outdoor exposure, especially in the presence of moisture, becoming hazy, physically weak, and susceptible to easy breaking. Polycarbonates and cast acrylic-based polymers have also been proposed, but in the forms suggested they are thick, inflexible, and expensive, and are difficult to cut to size and frame.

The present invention provides a new kind of composite polymeric film which comprises, briefly, (a) a thin transparent high-tensile-strength support film;
(b) a thin transparent weather-resistant oriented polymethylmethacrylate film; and
(c) a transparent adhesive layer disposed between said support and weather-resistant films to laminate the films together.

Preferably an absorber of ultraviolet light is dispersed in at least one of said films or adhesive layer to improve the weathering properties of the composite film.

In my earlier-issued U.S. Pat. No. 4,064,314, a composite film of my invention is claimed which comprises as the support film a linear, oriented, crystalline, heat-set polyester polymer such as polyethylene terephthalate. The polyester support film in such a composite film has a number of advantages—e.g., it has high tensile strength, generally good durability, and good resistance to acidic pollutants in the air. However, it is weaker in tear resistance than desired for some uses, with the result that if a composite film as described is punctured, a tear may propagate in the film.

Products of the present invention avoid such a weakness to tearing. I have found that when polycarbonate films are used as the support film in composite films of my invention, tear propagation is inhibited, while other advantages, arising from the combination of polymethylmethacrylate films with a high-tensile-strength support film, are maintained. A composite of such polymethylmethacrylate and polycarbonate films provides a desired alternative for a variety of uses, particularly as outdoor-facing windows or other transparent panels in exterior structures, ranging from greenhouses, to homes, to structures such as heated boxes (for growing plants) and solar collectors (e.g. in which solar rays pass through a transparent panel to apparatus that receives the rays and accumulates heat energy). Common to all these uses is outdoor exposure, for which composite films of the present invention are particularly adapted.

DESCRIPTION OF THE DRAWING

The drawing shows an illustrative transparent composite film 10 of the invention. This composite film includes a weather-resistant film 11, a layer of adhesive 12, and a support film 13.

DETAILED DESCRIPTION

Oriented polymethylmethacrylate film has especially good weathering properties. Samples of it subjected to outdoor exposure tests for 10 years show no apparent degradation. One reason for these good weathering properties is that the film absorbs little if any ultraviolet light energy.

The film also has good physical properties, which are enhanced by the fact that it is prepared as an oriented film (generally biaxially oriented). The film is flexible and has good fatigue resistance, has a hard surface, has good tensile properties and is compatible with the associated components in the composite film. The film is generally less than about 100-150 micrometers in thickness to preserve flexibility, and is typically at least 25-50 micrometers in thickness. If desired, weather-resistant films may be adhered on both sides of the support film.

As indicated above, polycarbonate films are a preferred support film for many purposes. Commercial polycarbonates generally are thermoplastic aromatic polycarbonates having a formula as follows:

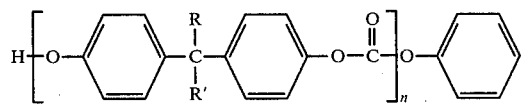

Polycarbonates based on bisphenol A (4,4'-isopropylidene diphenol, where R and R' in the above formation are a methyl group) are the most common commercial film. The useful polycarbonate films generally have a tensile break strength of greater than about 5000 pounds per square inch (about 350 kilograms per square centimeter) and good durability when covered by the polymethylmethacrylate film. Particularly they offer good tear resistance and impact strength. The support film in composite films of my invention can vary in thickness, for example, from 10 micrometers to 750 micrometers; polycarbonate films are generally greater than 100 micrometers, and preferably are about 250 micrometers, in thickness.

The adhesive used to laminate the weather-resistant and support films together should be a clear transparent adhesive. Preferably, it is a pressure-sensitive adhesive so that the laminating operation may be performed at room temperature. Pressure-sensitive adhesives based on esters of acrylic acid are particularly useful because of their good adhesion, clarity, light-transmissibility, and resistance to degradation by ultraviolet light. Rubber-resin adhesives having good resistance to ultraviolet light may also be used. In addition, heat-activated or solvent-activated adhesives are useful. Preferably the adhesive layer is flexible in the finished composite film structure so as to absorb strains and permit the composite film structure to be flexible even in extreme cold. Desirably the composite film of the invention is sufficiently flexible so that it may be wound in a storage roll, and for this purpose, it is desirable that the film be rollable about a ten-centimeter-diameter support mandrel.

Absorbers of ultraviolet light energy are preferably included in a composite film of the invention to retard degradation of the polycarbonate film. Desirably the absorber is included in one or more of the layers that cover the polycarbonate film, and may also be included in the polycarbonate film. Useful ultraviolet light absorbers include hydroxy benzophenones (such as "Uvinol 400" supplied by General Aniline Film), 2(2'-hydroxy-5'-methylphenyl) benzotriazole (such as "Tinuvin P" supplied by Ciba-Geigy), phenyl salicylate, and diphenyl phthalate.

The invention will be further illustrated by the following example. A three-mil-thick (75-micrometer-thick) biaxially oriented polymethylmethacrylate film containing one weight-percent of Uvinol 400 was prepared by mixing the absorber into a melt of the polymer ("Lucite 147" supplied by DuPont) and then extruding and orienting the mixture. A ten-mil-thick (250-micrometer-thick) transparent polycarbonate film containing one weight-percent dimerized benzophenone ultraviolet light-absorber was mixed into premelted polycarbonate and the mixture extruded to form a ten-mil-thick (250-micrometer-thick) film. A transparent solution of a pressure-sensitive adhesive copolymer of isooctyl acrylate and acrylic acid dissolved in a mixture of heptane and isopropanol solvent was then knife-coated onto the polycarbonate film to give a dry thickness of 0.5 mil (12.5 micrometers). After drying the coating in ovens heated to 150° F. (65° C.) for 10 minutes, the polymethylmethacrylate film was laminated against the adhesive by passing the assembly through squeeze rolls.

What is claimed is:

1. A transparent composite film useful as an inexpensive, non-brittle, impact-resistant, durable, outdoor-facing transparent panel comprising
    (a) a continuous transparent high-tensile-strength polycarbonate support film;
    (b) a continuous transparent weather-resistant oriented polymethylmethacrylate film; and
    (c) a transparent adhesive layer disposed between said support and weather-resistant films to laminate the films together.

2. A composite film of claim 1 in which an absorber of ultraviolet light is dispersed in at least one of said films or adhesive layers.

3. A composite film of claim 1 in which said weather-resistant film includes an absorber of ultraviolet light dispersed in the film.

4. A composite film of claim 1 in which said adhesive layer is a pressure-sensitive adhesive.

5. A composite film of claim 4 in which said pressure-sensitive adhesive comprises an adhesive polymer based on an ester of acrylic acid.

6. A transparent composite film useful as an inexpensive, non-brittle, impact-resistant, durable, outdoor-facing window pane comprising
    (a) a continuous transparent high-tensile-strength polycarbonate support film;
    (b) a continuous transparent weather-resistant oriented polymethylmethacrylate film containing an absorber of ultraviolet light dispersed in the film; and
    (c) a transparent adhesive layer comprising an adhesive polymer based on an ester of acrylic acid disposed between said support and weather-resistant films to laminate the films together.

7. A composite film of claim 6 in which an absorber of ultraviolet light is dispersed in at least one of said polycarbonate support film and adhesive layer.

* * * * *